United States Patent
Wada et al.

(10) Patent No.: US 10,553,938 B2
(45) Date of Patent: Feb. 4, 2020

(54) IN-VEHICLE ANTENNA AND IN-VEHICLE COMMUNICATION DEVICE

(71) Applicants: TOYOTA JIDOSHA KABUSHIKI KAISHA, Toyota-shi, Aichi-ken (JP); DENSO CORPORATION, Kariya-shi, Aichi-ken (JP)

(72) Inventors: Tetsuro Wada, Miyoshi (JP); Shiro Koide, Kariya (JP)

(73) Assignees: TOYOTA JIDOSHA KABUSHIKI KAISHA, Toyota-shi (JP); DENSO CORPORATION, Kariya-shi (JP)

(*) Notice: Subject to any disclaimer, the term of this patent is extended or adjusted under 35 U.S.C. 154(b) by 22 days.

(21) Appl. No.: 15/741,884

(22) PCT Filed: Jul. 8, 2016

(86) PCT No.: PCT/JP2016/070289
§ 371 (c)(1),
(2) Date: Jan. 4, 2018

(87) PCT Pub. No.: WO2017/007025
PCT Pub. Date: Jan. 12, 2017

(65) Prior Publication Data
US 2018/0198193 A1 Jul. 12, 2018

(30) Foreign Application Priority Data
Jul. 8, 2015 (JP) .................. 2015-137203

(51) Int. Cl.
*H01Q 1/24* (2006.01)
*H01Q 1/32* (2006.01)
(Continued)

(52) U.S. Cl.
CPC ......... *H01Q 1/3291* (2013.01); *H01Q 1/1271* (2013.01); *H01Q 21/24* (2013.01); *H04B 7/10* (2013.01)

(58) Field of Classification Search
CPC .... H01Q 1/3291; H01Q 1/3275; H01Q 21/24; H04B 7/10
See application file for complete search history.

(56) References Cited

U.S. PATENT DOCUMENTS 6,744,823 B1    6/2004  Kamemura et al.
2004/0180650 A1 9/2004  Kamemura et al.
(Continued)

FOREIGN PATENT DOCUMENTS

JP   H11-274994 A   10/1999
JP   2012-054915 A  3/2012
JP   2015-097377 A  5/2015

OTHER PUBLICATIONS

NTT docomo, "Success in an outdoor experiment of wireless transmission technology for LTE-Advanced Smart Vertical MIMO" (Nov. 13, 2013), 4 pages. URL: https://www.nttdocomo.co.jp/info/news_release/2013/11/13_01.html.

*Primary Examiner* — Graham P Smith
(74) *Attorney, Agent, or Firm* — Hunton Andrews Kurth LLP

(57) ABSTRACT

This in-vehicle antenna to be used for wireless communication of a vehicle includes a horizontally polarized antenna, and a vertically polarized antenna that is separated from the horizontally polarized antenna by a predetermined distance. The in-vehicle antenna obtains, from among a plurality of signals received using the horizontally polarized antenna and the vertically polarized antenna, a plurality of signals transmitted at one time using a polarization technology.

3 Claims, 2 Drawing Sheets

(51) Int. Cl.
*H01Q 21/24* (2006.01)
*H04B 7/10* (2017.01)
*H01Q 1/12* (2006.01)

(56) References Cited

U.S. PATENT DOCUMENTS

2004/0180698 A1 9/2004 Kamemura et al.
2015/0097738 A1* 4/2015 Sugimoto ............ H01Q 1/3275
343/702

* cited by examiner

IN-VEHICLE ANTENNA AND IN-VEHICLE COMMUNICATION DEVICE

CROSS-REFERENCE TO RELATED APPLICATIONS

This is a national phase application based on the PCT International Patent Application No. PCT/JP2016/070289 filed Jul. 8, 2016, claiming priority to Japanese Patent Application No. 2015-137203 filed Jul. 8, 2015, the entire contents of both of which are incorporated herein by reference.

TECHNICAL FIELD

The present invention relates to an in-vehicle antenna installed to a vehicle such as an automobile and an in-vehicle communication device that uses the in-vehicle antenna for communication.

BACKGROUND ART

Many vehicles include an antenna used for wireless communication performed with, for example, a wireless communication base station. In order for a vehicle to maintain a satisfactory communication state while traveling where the communication environment constantly changes, there is a demand for an in-vehicle antenna that has an improved function for maintaining communication such as a high-gain antenna. Patent document 1 describes one example of an in-vehicle antenna that has an improved function for maintaining communication.

The in-vehicle antenna described in patent document 1 includes a first antenna and a second antenna that are spaced apart from each other in a front-rear direction of a vehicle. The element length of the first antenna is less than the element length of the second antenna. Thus, the first antenna acts as a director of the second antenna, and the second antenna obtains a satisfactory directionality at the front of the vehicle. Additionally, the second antenna acts as a reflector of the first antenna. The first antenna also obtains a satisfactory directionality at the front of the vehicle.

PRIOR ART DOCUMENT

Patent Document

Patent Document 1: Japanese Laid-Open Patent Publication No. 2012-54915

SUMMARY OF THE INVENTION

Problems that are to be Solved by the Invention

With the in-vehicle antenna described in patent document 1, both of the first antenna and the second antenna obtain a satisfactory directionality at the front of the vehicle even when the two antennas are located closer to each other at a distance that generates mutual interference. This allows any one of the antennas to receive radio waves from the front of the vehicle in a satisfactory manner.

The proportion of data communication, which requires higher traffic than a telephone call, has been increased in recent communication contents. Additionally, the traffic of data communication has been increased more than ever. Thus, there is also a demand that vehicles perform high-speed data communication. However, high-speed communication cannot necessarily be achieved just by improving the function that maintains communication.

It is an object of the present invention to provide an in-vehicle antenna capable of performing high-speed communication and an in-vehicle communication device that performs communication using the in-vehicle antenna.

Means for Solving the Problem

To achieve the above object, one aspect of the present invention is an in-vehicle antenna that is used for wireless communication of a vehicle. The in-vehicle antenna includes a horizontally polarized antenna and a vertically polarized antenna spaced apart from the horizontally polarized antenna by a predetermined distance. The in-vehicle antenna obtains a plurality of signals, which is simultaneously transmitted using a polarization technique, from a plurality of signals received with the horizontally polarized antenna and the vertically polarized antenna.

Another aspect of the present invention is an in-vehicle communication device that performs wireless communication of a vehicle using an in-vehicle antenna. The in-vehicle communication device includes a horizontally polarized antenna, a vertically polarized antenna spaced apart from the horizontally polarized antenna by a predetermined distance, and a signal processor that performs signal-processing that obtains each of a plurality of signals, which is simultaneously transmitted using a polarization technique, from signals received with the horizontally polarized antenna and the vertically polarized antenna.

EMBODIMENTS OF THE INVENTION

Figure 1:
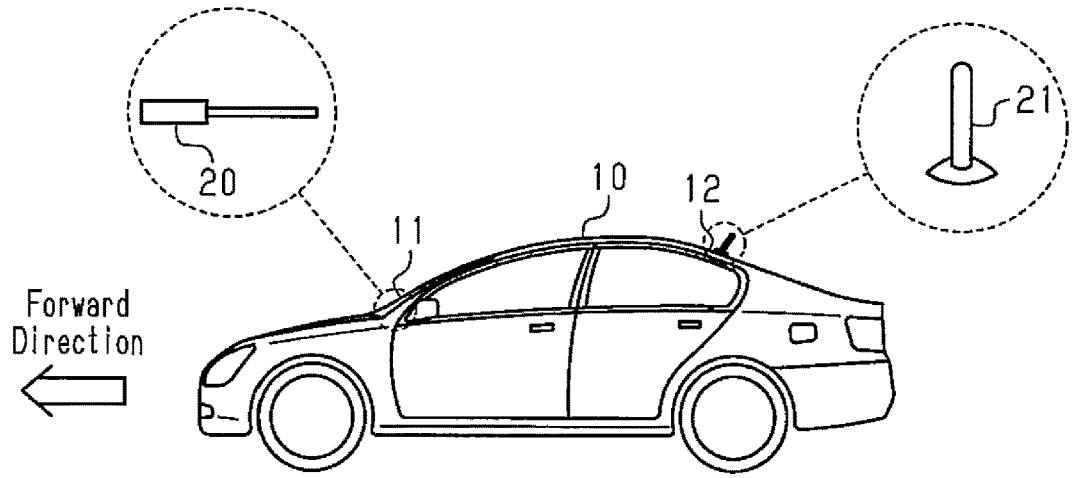
FIG. 1 is a schematic diagram showing the structure of an in-vehicle communication device that uses one embodiment of an in-vehicle antenna for communication according to the present invention.

One embodiment of an in-vehicle communication device that uses an in-vehicle antenna for communication will now be described with reference to FIGS. 1 to 4.

A vehicle 10 such as a passenger vehicle receives radio waves from a wireless communication base station with an in-vehicle antenna to perform normal communication or high-speed communication. Normal communication radio waves and high-speed communication radio waves, which are transmitted from the wireless communication base station and received by the vehicle 10, will now be described.

Communication Technique

A base station transmits radio waves for telephone calls and data communication to a communication subject such as a portable communication device or a communication device of a mobile body. Additionally, a wireless communication base station selects a radio wave from a normal communication radio wave and a high-speed communication radio wave and transmits the radio wave to a communication device of the vehicle 10, which functions as a communication subject, in accordance with, for example, the state or purpose of communication performed with the communication device of the vehicle 10. For example, when priority is given to the ensuring of communication with the communication subject, the base station selects the normal communication radio wave. The base station selects the high-speed communication radio wave to increase the communication speed under a condition in which communication is ensured.

In the present embodiment, the normal communication radio wave complies with 3G (third generation) mobile telecommunication standard. The high-speed communication radio wave complies with long term evolution (LTE). Here, 3G is a mobile telecommunication standard used in a conventional in-vehicle telephone system, and LTE is one of next-generation mobile telecommunication standards that are so-called 3.9G (3.9 generation) mobile telecommunication standards or 4G (fourth generation) mobile communication standards. Since LTE is capable of performing communication at a higher speed than 3G, LTE improves the accessibility of conventional services, for example, an expansion of contents such as downloading of moving pictures from the Internet and an increase in the speed of updating maps. Although described in detail later, the in-vehicle communication device of the vehicle 10 also needs to comply with LTE to perform communication in compliance with the LTE communication standard.

In the present embodiment, the normal communication radio wave transmits a single piece of data through a vertically polarized wave, and the high-speed communication radio wave simultaneously transmits two signals using a polarization technique. The base station selects the normal communication radio wave if radio wave strength between the base station and the communication subject is less than a predetermined threshold value, and selects the high-speed communication radio wave if the radio wave strength is greater than or equal to the predetermined threshold value. The radio wave strength is generally increased as the distance becomes shorter between the base station and the communication subject, and is decreased as the distance becomes longer between the base station and the communication subject.

One example of the polarization technique described above will now be described.

The polarization technique, which is also referred to as the polarization diversity, simultaneously transmits two radio waves that include signals differing from each other using polarized waves that are orthogonal to each other such as a vertically polarized wave and a horizontally polarized wave. Additionally, in the polarization technique, when a reception device receives the combined wave of the two radio waves, the reception device obtains the two signals from the combined wave. It is known that the polarization technique is applicable to multiple-input and multiple-output (MIMO), which is one of wireless communication techniques that combine a plurality of antennas for wireless transmission and reception to widen a data communication band and increase the transmission speed. In MIMO to which the polarization technique is applied, data that is to be transmitted is divided into two signals, and then the two signals are modulated into different polarized waves and simultaneously transmitted from two antennas (antenna corresponding to two) at the same frequency band. The reception side receives the two signals with two antennas. Since each antenna of the reception side receives the combined wave of the radio waves that were transmitted by the two antennas, the reception side obtains the two transmitted signals through a process considering distortions and differences in reception strength of the radio waves transmitted from each of the antennas through different paths.

In-Vehicle Communication Device

A (reception side) in-vehicle communication device including an in-vehicle antenna, which receives the high-speed communication radio wave described above, will now be described with reference to FIGS. 1 and 2.

As shown in FIG. 1, the vehicle 10 includes an in-vehicle antenna. The in-vehicle antenna includes a horizontally polarized antenna 20, which is installed on a meter panel 11 (instrument panel) located in the passenger compartment, and a vertically polarized antenna 21, which is installed on a rear portion, which is opposite to the forward direction, of a roof 12 located outside the vehicle. The horizontally polarized antenna 20, which has a high gain for horizontally polarized radio waves, is suitable for receiving horizontally polarized radio waves. The horizontally polarized antenna 20 is, for example, an inverted-L antenna. The horizontally polarized antenna 20 is arranged so as to have directionality in the forward direction. The vertically polarized antenna 21, which has a high gain for vertically polarized radio waves, is suitable for receiving vertically polarized radio waves. The vertically polarized antenna 21 is, for example, a monopole antenna. The horizontally polarized antenna 20 and the vertically polarized antenna 21 are separated from each other by a predetermined distance or greater, for example, approximately 30 cm or greater. The predetermined distance may be set to a value that is theoretically obtained through tests, experiences, or wavelengths of radio waves. As compared to the passenger compartment, where many shields such as the glass and the body are located between a transmission antenna and a reception antenna, the radio wave strength is generally high at the outside of the vehicle, where there are no or a few shields. Additionally, the communicable distance becomes longer as the height of an antenna from the ground is increased. Therefore, when the horizontally polarized antenna 20 and the vertically polarized antenna 21 have the same reception properties, the vertically polarized antenna 21, which is located on the roof 12 outside the vehicle, receives a stronger radio wave than the horizontally polarized antenna 20. Many normal communication radio waves complying with 3G communication standard are vertically polarized. According to the configuration of the in-vehicle antenna described above, the vertically polarized antenna 21 is capable of receiving a signal at a higher strength (has a higher gain for signal) than the horizontally polarized antenna 20. In other words, the communication of the normal communication radio waves, which is performed using only the vertically polarized antenna 21 in compliance with the 3G communication standard, is easily ensured relative to the LTE communication, which is performed using the horizontally polarized antenna 20 together with the vertically polarized antenna 21.

Figure 2:
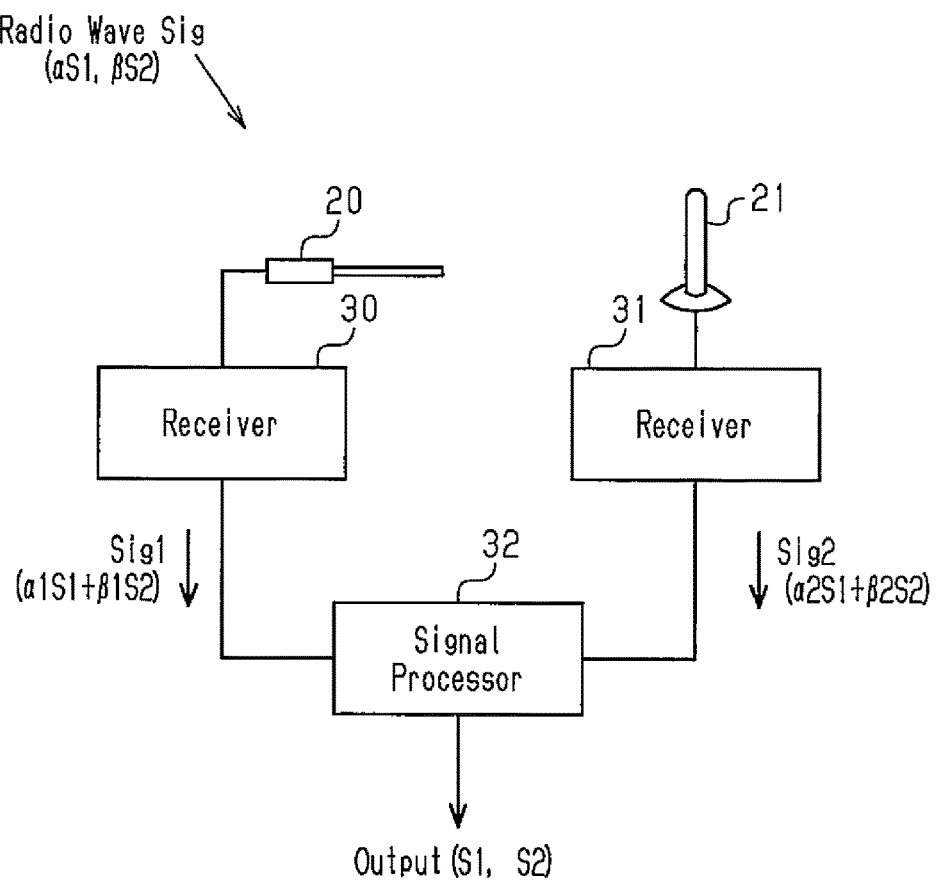
FIG. 2 is a block diagram showing the schematic structure of the in-vehicle communication device shown in FIG. 1.

As shown in FIG. 2, the vehicle 10 includes a first receiver 30, which receives a radio wave Sig that was received by the horizontally polarized antenna 20, and a second receiver 31, which receives a radio wave Sig that was received by the vertically polarized antenna 21. The first and second receivers 30, 31 demodulate the radio waves Sig received from the respective antennas and transmit demodulated signals Sig1, Sig2 to a signal processor 32. Each of the first and second receivers 30, 31 receives a radio wave that has been modulated through a known modulation process and demodulates the radio wave using a known demodulation technique.

The signal processor 32 demodulates and obtains one or two signals based on the two signals Sig1, Sig2, which are received from the first and second receivers 30, 31, in accordance with the 3G communication standard, the LTE communication standard, the MIMO communication technique, and the polarization technique. More specifically, in the normal communication (3G), the signal processor 32 obtains one signal based on one signal selected from the two input signals. In the high-speed communication (LTE), the signal processor 32 obtains two signals based on the two input signals. The signal processor 32 outputs the one or two obtained signals.

The signal processor 32, for example, determines whether or not the radio wave strength is greater than or equal to a predetermined strength. When the signal processor 32 determines that the radio wave strength is greater than or equal to the predetermined strength, the signal processor 32 receives the two signals Sig1, Sig2, which were transmitted using the polarization technique, from the vertically polarized antenna 21 and the horizontally polarized antenna 20. When the signal processor 32 determines that the radio wave strength is less than the predetermined strength, the signal processor 32 receives a signal, which was transmitted using a technique (3G) that does not use the polarization technique, from one of the vertically polarized antenna 21 and the horizontally polarized antenna 20. The standard and technique of radio waves communicated between the base station and the signal processor 32 are configured to be synchronized.

In the high-speed communication, the signal processor 32 executes a process considering distortions caused by the path of each of the two input signals Sig1, Sig2 to obtain two signals S1, S2. Additionally, in the high-speed communication, the signal processor 32 increases the accuracy for identifying a horizontally polarized wave and a vertically polarized wave based on the difference between the strength of a polarized wave received by the horizontally polarized antenna 20 and the strength of a polarized wave received by the vertically polarized antenna 21 to improve the accuracy for obtaining the two signals S1, S2. In the normal communication, since many normal communication radio waves comply with 3G and are vertically polarized, the signal processor 32 is highly likely to select a signal obtained based on the radio wave received by the vertically polarized antenna 21 as a signal having a high radio wave strength. More specifically, the 3G communication is highly likely to be maintained based on the radio wave received by the vertically polarized antenna 21. Therefore, it is preferred that the vertically polarized antenna 21 be arranged outside the vehicle.

Operation

The operation of the in-vehicle communication device will now be described with reference to FIGS. 2 to 4.

As shown in FIG. 2, it is assumed that the base station transmits a high-speed communication radio wave Sig using the polarization technique. The radio wave Sig includes a combined wave of a radio wave αS1, which corresponds to a horizontally polarized first signal S1, and a radio wave βS2, which corresponds to a vertically polarized second signal S2. More specifically, the radio wave Sig is configured to be the combined wave of the horizontally polarized radio wave αS1 and the vertically polarized radio wave βS2. Here, "α" indicates that the radio wave has a property of a horizontally polarized wave, and "β" indicates that the radio wave has a property of a vertically polarized wave.

Each of the horizontally polarized antenna 20 and the vertically polarized antenna 21 receives the radio wave Sig, which is the combined wave of the radio wave αS1 and the radio wave βS2. The horizontally polarized antenna 20 and the vertically polarized antenna 21 are located at different positions. Thus, the radio wave Sig received by the horizontally polarized antenna 20 and the radio wave Sig received by the vertically polarized antenna 21 have different distortions. Additionally, the horizontally polarized antenna 20 receives the horizontally polarized radio wave αS1 at a higher radio wave strength than the vertically polarized radio wave βS2. In contrast, the vertically polarized antenna 21 receives the vertically polarized radio wave βS2 at a higher radio wave strength than the horizontally polarized radio wave αS1.

The first receiver 30, which receives the radio wave Sig from the horizontally polarized antenna 20, outputs a reception signal Sig1. The second receiver 31, which receives the radio wave from the vertically polarized antenna 21, outputs a reception signal Sig2. The reception signal Sig1 is configured as a signal ($\alpha 1S1 + \beta 1S2$). The reception signal Sig2 is configured as a signal ($\alpha 2S1 + \beta S2$). Each of "α1, α2" and "β1, β2" represents signal properties, here, indicating that "α1" is stronger than "α2" and that "β2" is stronger than "β1."

The signal processor 32 receives the signal Sig1, which is based on the radio wave received by the horizontally polarized antenna 20, and the signal Sig2, which is based on the radio wave received by the vertically polarized antenna 21. The signal processor 32 performs signal-processing on the received two signals Sig1, Sig2 taking into consideration at least one of the distortions and reception strength that are described above to separate the two signals S1, S2, which are combined in the signals Sig1, Sig2, from each other. When the horizontally polarized antenna 20 and the vertically polarized antenna 21 simultaneously receive the radio wave Sig, which is transmitted by the polarization technique, a large difference is produced in the radio wave due to the horizontally polarized wave and the vertically polarized wave. Larger differences generally increase the separability of the two combined signals. Thus, the signal processor 32, which uses the in-vehicle antenna of the present embodiment, increases the potential of performing communication using the high-speed communication radio wave.

Figure 3:
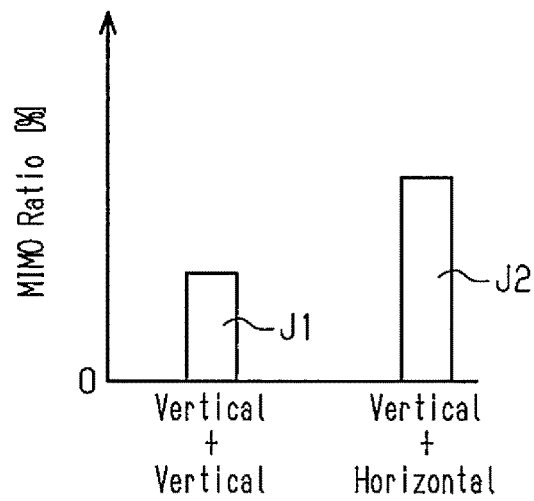
FIG. 3 is a graph showing a multiple-input and multiple-output (MIMO) ratio of the in-vehicle communication device shown in FIG. 2.
Figure 4:
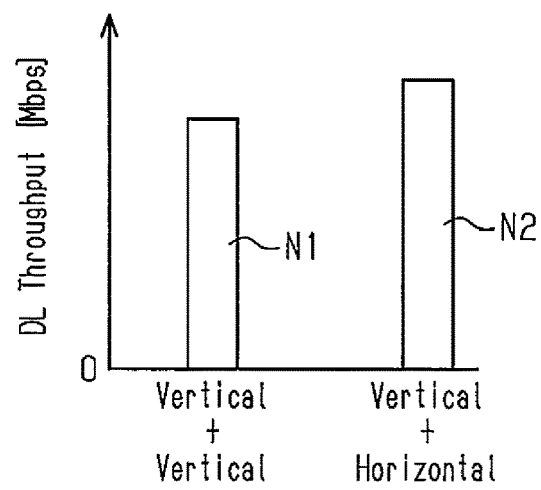
FIG. 4 is a graph showing a download (DL) throughput of the in-vehicle communication device shown in FIG. 2.

FIGS. 3 and 4 are graphs showing the communication states obtained by the inventors using the in-vehicle antenna of the present embodiment.

FIG. 3 shows one example of the relationship between the configuration of in-vehicle antenna and the probability (MIMO ratio) that the high-speed communication is performable. The graph indicates that a probability J2 that the high-speed communication is performed when one vertically polarized antenna 21 and one horizontally polarized antenna 20 receive the combined wave, which is transmitted using the polarization technique, is higher than a probability J1 that the high-speed communication is performed when two vertical antennas receive the combined wave. In this example, the probability J2 is approximately two times higher than the probability J1. The MIMO ratio is calculated by the following expression.

$$\text{MIMO Ratio[\%]} = (\text{MIMO Communication Time[s]} / \text{Total Measured Time[s]} \times 100)$$

FIG. 4 shows one example of the structure of in-vehicle antenna and the download (DL) throughput. Here, the download throughput is the amount of communication performed between the base station and the in-vehicle communication device per unit time, that is, a data transmission speed. Here, the unit is [Mbps]. As described above, the probability J2 that the high-speed communication is performable by one vertically polarized antenna 21 and one horizontally polarized antenna 20 is higher than the probability J1 that the high-speed communication is performable by two vertical antennas. A throughput value N2 downloaded by one vertically polarized antenna 21 and one horizontally polarized antenna 20 is greater than a throughput value N1 downloaded by in-vehicle antenna including two vertical antennas. In this example, the throughput value N2 is approximately 1.1 times greater than the throughput value N1.

This shows that when an in-vehicle communication device performs communication using an in-vehicle antenna that includes one vertically polarized antenna and one horizontally polarized antenna as in the present embodiment, the high-speed communication is performable.

As described above, the in-vehicle antenna and the in-vehicle communication device that uses the in-vehicle antenna for communication according to the present embodiment have the advantages described below.

(1) The in-vehicle antenna receives the two signals S1, S2, which are transmitted using a polarization technique such as the polarization diversity, at strength that allows the in-vehicle antenna to process the two signals S1, S2. More specifically, the in-vehicle antenna is capable of processing the two signals S1, S2. Thus, the high-speed communication is performable. Therefore, the in-vehicle antenna is capable of performing the high-speed communication.

(2) The vertically polarized antenna 21, which is arranged on the roof 12 located outside the vehicle, maintains a high gain. The horizontally polarized antenna 20, which extends in a horizontal direction, is installed in the passenger compartment. Thus, the design of the vehicle 10 is subtly affected.

(3) In general, a vertically polarized antenna has a high gain for a vertically polarized radio wave, and a horizontally polarized antenna has a high gain for a horizontally polarized radio wave. In the present embodiment, each of the antennas 20, 21 receives one of the radio waves, that is, the corresponding polarized wave, at a particularly high strength. Thus, the two signals S1, S2, which are simultaneously transmitted, are receivable at appropriate strengths. This improves the accuracy for obtaining the two signals S1, S2 from the received signals Sig1, Sig2.

(4) Communication that uses the polarization technique, which increases communication speed, tends to be unstable when the radio wave strength is decreased. In this regard, in the present embodiment, when the radio wave strength is high, signals are obtained at a high speed corresponding to the polarization technique. When the radio wave strength is low, signals are obtained without using the polarization technique to limit the communication speed so that priority is given to the ensuring of the communication. This increases the convenience of the in-vehicle communication device.

Other Embodiment

The above embodiment may be applied to the following modes.

In the above embodiment, the wireless communication base station selectively transmits one of the normal communication radio wave and the high-speed communication radio wave to the communication device of the vehicle 10. Instead, the wireless communication base station may transmit only the high-speed communication radio wave to the communication device of the vehicle. Even in this case, the high-speed communication is performable using the in-vehicle antenna.

In the above embodiment, the normal communication radio wave complies with 3G, and the high-speed communication radio wave complies with LTE. However, the combination of the communication standard of the normal communication radio wave and the communication standard of the high-speed communication radio wave is not limited to the above combination as long as the polarization technique improves the communication speed of the high-speed communication radio wave more than the communication speed of the normal communication radio wave.

In the above embodiment, in MIMO to which the polarization technique is applied, data that is to be transmitted is divided into two signals. Instead, two pieces of data that is to be transmitted may be prepared, and then each piece of data may be transmitted. This also increases the amount of data communication.

In the above embodiment, the polarization technique is configured to simultaneously transmit two radio waves including different signals using a vertically polarized wave and a horizontally polarized wave. However, the two transmitted polarized waves only need to be orthogonal to each other. This may allow the vertically polarized antenna and the horizontally polarized antenna to obtain large differences in distortion and strength.

Figure 5:
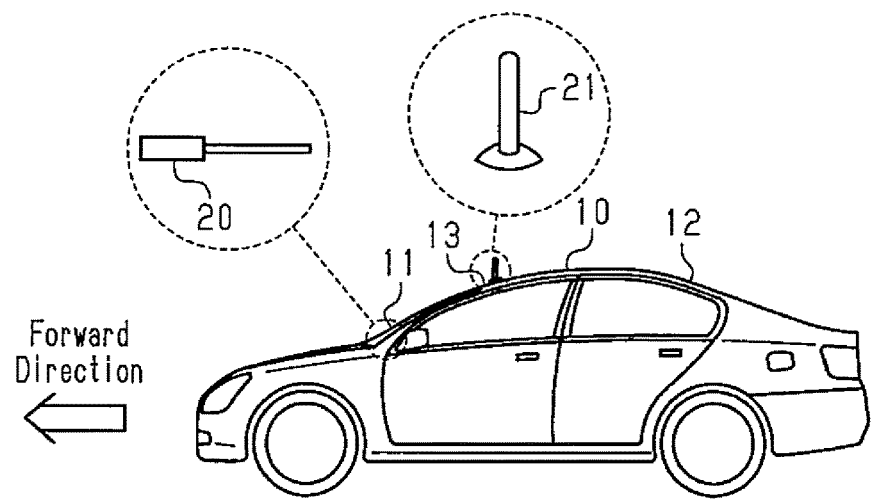
FIG. 5 is a schematic diagram showing the structure of an in-vehicle communication device that uses another embodiment of an in-vehicle antenna for communication according to the present invention.

In the above embodiment, the vertically polarized antenna 21 is installed on the rear portion of the roof 12. However, the vertically polarized antenna may be installed on a position other than the rear portion such as a center portion or a front portion of the roof. For example, as shown in FIG. 5, the vertically polarized antenna may be arranged on a front portion 13 of the roof. This increases the degree of freedom for arrangements of the in-vehicle antenna.

In the above embodiment, the vertically polarized antenna 21 is installed on the roof 12, which is located outside the vehicle. However, the vertically polarized antenna may be installed on a position other than the roof such as a front portion or a rear portion of a vehicle body, a fin, or a pole as long as an appropriate distance is ensured between the vertically polarized antenna and the horizontally polarized antenna. Further, the vertically polarized antenna may be arranged in the passenger compartment, for example, on the meter panel in the passenger compartment, the roof, the front window, or the rear window. This increases the degree of freedom for arrangements of the in-vehicle antenna.

In the above embodiment, the horizontally polarized antenna 20 is installed on the meter panel 11, which is located inside the vehicle. However, the horizontally polarized antenna may be installed on a position in the passenger compartment other than the meter panel such as the roof, the front window, the rear window, or inside the meter panel as long as an appropriate distance is ensured between the horizontally polarized antenna and the vertically polarized antenna. For example, when the horizontally polarized antenna is installed in the meter panel, the design of the passenger compartment is maintained. Further, the horizontally polarized antenna may be arranged outside the vehicle on a front portion or rear portion of the vehicle body, the roof, the front window, or the rear window. This increases the degree of freedom for arrangements of the in-vehicle antenna.

In the above embodiment, the horizontally polarized antenna 20 is arranged so as to have the directionality in the forward direction. However, the horizontally polarized antenna may have directionality that is angled from the forward direction as long as the high-speed communication is performable.

In the above embodiment, the vehicle 10 is a passenger vehicle. Instead, the vehicle may be an automobile such as a business vehicle, a two-wheeled vehicle, a bus, a truck, an agro-industrial vehicle, or a construction vehicle. Further, the vehicle is not limited to an automobile and may be a body that moves on the ground such as a railway vehicle.

In the above embodiment, the vehicle 10 receives radio waves from the wireless communication base station. However, the normal communication radio waves and the high-speed communication radio waves may be transmitted from a small-scale transmission device such as that used in a road infrastructure or a transmission device of another vehicle.

What is claimed is:

1. An in-vehicle communication device that performs wireless communication of a vehicle using an in-vehicle antenna, the in-vehicle communication device comprising:
   a horizontally polarized antenna;
   a vertically polarized antenna spaced apart from the horizontally polarized antenna by a predetermined distance; and
   a signal processor that performs signal-processing that obtains each of a plurality of signals, which is simultaneously transmitted using a polarization technique, from signals received with the horizontally polarized antenna and the vertically polarized antenna, wherein
   when a radio wave strength is greater than or equal to a predetermined strength, the signal processor obtains the plurality of signals, which is transmitted using the polarization technique, from each of the vertically polarized antenna and the horizontally polarized antenna, and
   when the radio wave strength is less than the predetermined strength, the signal processor obtains a signal transmitted using a technique that does not use the polarization technique from one of the vertically polarized antenna and the horizontally polarized antenna.

2. The in-vehicle communication device according to claim 1, wherein
   the vehicle includes a roof and a passenger compartment, the vertically polarized antenna is arranged on the roof of the vehicle, and
   the horizontally polarized antenna is arranged in the passenger compartment of the vehicle.

3. The in-vehicle communication device according to claim 1, wherein the polarization technique is a technique that transmits the plurality of signals having polarized waves that are directed orthogonal to each other.

* * * * *